United States Patent
Yu et al.

(10) Patent No.: US 6,907,899 B2
(45) Date of Patent: Jun. 21, 2005

(54) SADDLE TANK FUEL DELIVERY SYSTEM

(75) Inventors: DeQuan Yu, Ann Arbor, MI (US);
John Aittama, Monroe, MI (US);
Daven C. Bhavsar, Canton, MI (US);
Allen F. Bolton, Canton, MI (US);
David Zultowski, Canton, MI (US);
Tom Beishuizen, Canton, MI (US);
Rafat Mohammad, Dearborn, MI (US);
David B. Boyle, Carleton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 211 days.

(21) Appl. No.: 10/349,416

(22) Filed: Jan. 22, 2003

(65) Prior Publication Data

US 2004/0140009 A1 Jul. 22, 2004

(51) Int. Cl.[7] ............................ F02M 37/10; F02M 37/14
(52) U.S. Cl. .................. 137/565.22; 137/265; 123/509; 123/514
(58) Field of Search ......................... 137/565.22, 265, 137/574; 123/509, 510, 514

(56) References Cited

U.S. PATENT DOCUMENTS

| | | | |
|---|---|---|---|
| 4,838,307 A | 6/1989 | Sasaki et al. | |
| 5,082,426 A | 1/1992 | Sasaki et al. | |
| 5,133,324 A | 7/1992 | Michiaki | |
| 5,732,684 A | 3/1998 | Thompson | |
| 5,743,239 A | 4/1998 | Iwase | |
| 5,797,373 A | 8/1998 | Kleppner et al. | |
| 6,062,203 A | 5/2000 | Takahashi et al. | |
| 6,283,142 B1 | 9/2001 | Wheeler et al. | |
| 6,341,623 B1 | 1/2002 | Channing | |
| 6,371,153 B1 | 4/2002 | Fischerkeller et al. | |
| 6,453,884 B2 | 9/2002 | Ushigome | |
| 2002/0043253 A1 | 4/2002 | Begley et al. | |
| 2002/0083983 A1 | 7/2002 | Coha et al. | |
| 2002/0112700 A1 | 8/2002 | Iwamoto et al. | |
| 2003/0062031 A1 * | 4/2003 | Tanimura | 123/510 |

FOREIGN PATENT DOCUMENTS

| | | |
|---|---|---|
| JP | 8226357 | 9/1996 |
| JP | 2001020900 | 1/2001 |

* cited by examiner

*Primary Examiner*—Kevin Lee
(74) *Attorney, Agent, or Firm*—Brinks Hofer Gilson & Lione

(57) ABSTRACT

The present invention provides a fuel delivery system for a saddle fuel tank wherein a fuel pump and a jet pump are positioned within an active side of the tank. The jet pump is directly driven by the fuel pump to draw the fuel from a passive side of the tank to the active side of the tank.

12 Claims, 5 Drawing Sheets

SADDLE TANK FUEL DELIVERY SYSTEM

BACKGROUND

1. Technical Field

This invention relates generally to automotive fuel delivery and, more specifically, to an improved saddle tank fuel delivery system in an automotive vehicle.

2. Description of the Related Art

Saddle fuel tanks are widely used for automotive applications. They are most frequently used with rear wheel drive vehicles and they are designed to hold more fuel than a standard fuel tank.

Saddle fuel tanks include two compartments for storage of fuel connected by a bridge. One known type of saddle tank fuel delivery system involves two fuel pumps, one positioned in each compartment of the tank. Each pump provides the fuel from its respective compartment to the engine. Disadvantages of this type system are the complexity of the system and its expense since there are basically two fuel delivery systems in the vehicle.

Another known type of saddle tank fuel delivery system includes one fuel pump and a jet pump located in the "active" compartment of the tank. The jet pump functions to draw the fuel from the "passive" side of the tank. The jet pump in this type of system is driven by returned fuel that was oversupplied to the engine. In other words, there is a return supply tube that carries fuel that was excessively supplied to the engine back to the fuel tank. The jet pump is connected to and driven by the return supply tube. A disadvantage of this system is that it cannot be used with a returnless fuel delivery system since returnless systems do not use a separate return supply tube. Jet pump efficiency is low because of engine rail back-up pressure limitations.

In view of the above and other disadvantages, there exists a need for an improved saddle tank fuel delivery system.

SUMMARY OF INVENTION

The present invention overcomes the disadvantages of prior designs by providing a less complex fuel delivery assembly having a single fuel pump in a returnless fuel delivery system for a saddle tank.

The fuel delivery system of the present invention includes a saddle fuel tank that stores fuel used to power a vehicle's engine. The saddle fuel tank has a pair of opposed storage compartments, one being an active side and the other being a passive side. A fuel pump and a jet pump are both positioned in the active side of the tank. Further, the jet pump is directly driven by the fuel pump to draw the fuel from the passive side of the tank to the active side of the tank.

An advantage of the present invention is that the system is more efficient than known saddle tank fuel delivery systems. It is common knowledge that fuel pumps function more efficiently if their output does not fall below a certain minimum flow rate. In known saddle tank fuel delivery systems, the fuel pump's output varies greatly due to the ever changing fuel requirements of the engine. The flow rate often fluctuates below the desired minimum since the fuel flow is solely dependent upon the engine requirements. In the present invention, fuel is drawn by the fuel pump based on engine requirements and flow required by the jet pump. Therefore, the pump can operate above the minimum flow rate due to the constant flow required for the jet pump to properly operate. The fuel pump can operate pumping a minimum of 20–30 liters per hour of fuel, even during periods when the engine is idling.

Another advantage of the present invention is that there are fewer components necessary for the system to operate. Therefore, the fuel delivery system of the present invention is less expensive to manufacture.

These and other aspects and advantages of the present invention will become apparent upon reading the following detailed description of the invention in combination with the accompanying drawings.

DETAILED DESCRIPTION OF THE INVENTION

Figure 1:
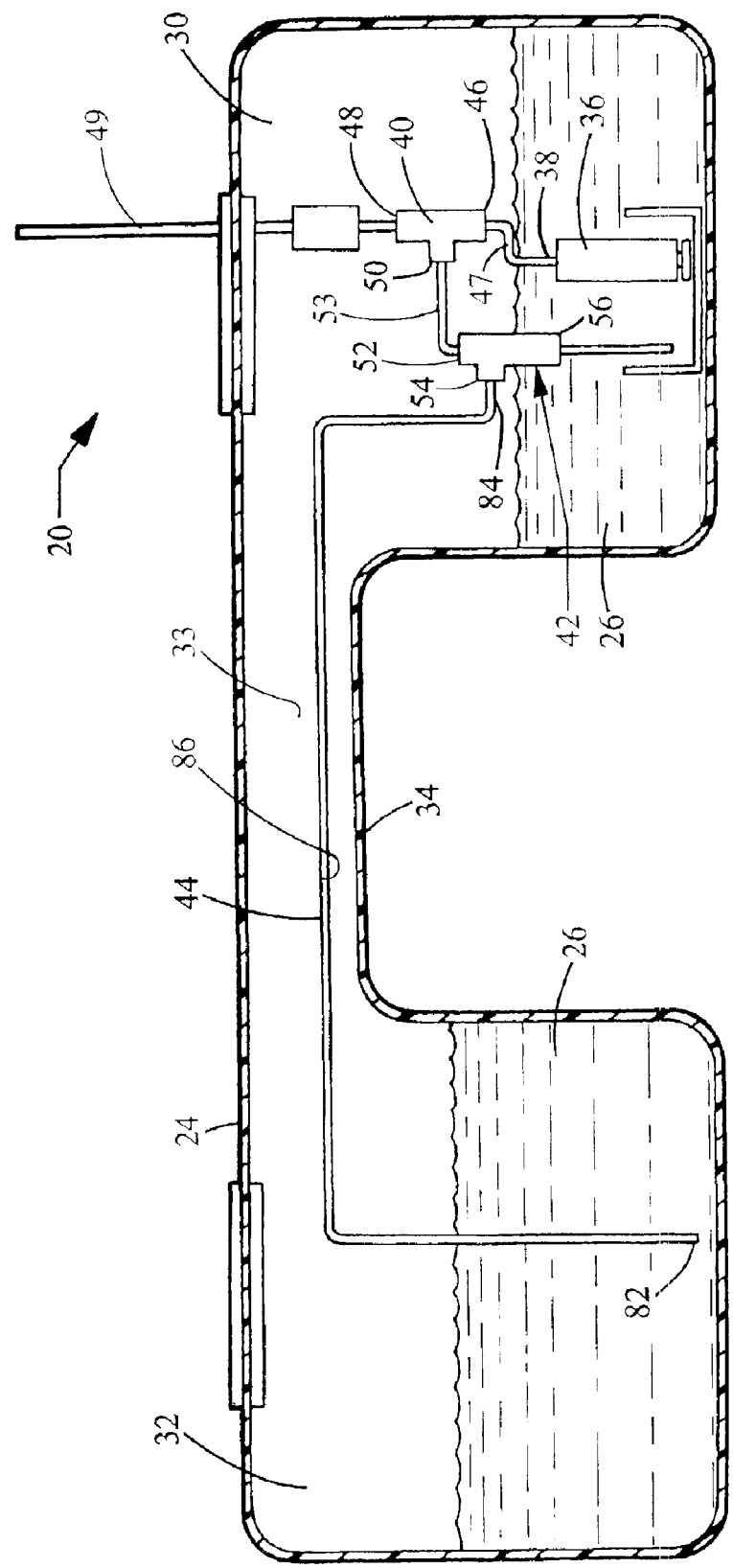
FIG. 1 is a schematic view of a first embodiment of a fuel delivery system according to the present invention.

FIG. 1 generally illustrates the fuel delivery system 20 of the present invention. The fuel delivery system 20 is positioned within a vehicle (not shown) that has a saddle fuel tank 24, which stores fuel 26 used to power the vehicle's engine (not shown). An upward projection 34 in the bottom wall of the saddle tank 24 separates the tank 24 into generally opposed compartments, herein referred to as an active side 30 and a passive side 32 and fluidly connected by a bridge 33. Fuel 26 is stored in both the active side 30 and the passive side 32 of the tank 24.

There is a single fuel pump 36 for the system 20 and this fuel pump 36 directly drives a jet pump 42. Both the fuel pump 36 and the jet pump 42 are positioned in the active side 30 of the tank 24. The function of the fuel pump 36 is to pump fuel 26 from the tank 24 to the vehicle's engine, while the function of the jet pump 42 is to draw fuel 26 from the passive side 32 to the active side 30 of the tank 24. A single crossover tube 44 carries the fuel 26 from the passive side 32 to the active side 30 of the tank 24. Preferably, the crossover tube 44 is contained within the fuel tank 24, extending through the bridge 33, and is connected to the jet pump 42 on the active side 30.

The fuel pump 36 has an outlet 38. Fuel 26 exiting from outlet 38 is directed into a diverter 40 via a diverter inlet 46 and a connecting conduit 47. The diverter 40 diverts the fuel 26 exiting from the fuel pump 36 in two directions via two diverter outlets 48, 50. Fuel 26 exiting from the first diverter outlet 48 is in fluid communication with the engine so fuel 26 is directed via a conduit 49 to the fuel rail (not shown), which delivers the fuel to the engine. Fuel exiting from the second diverter outlet 50 is directed into the jet pump 42.

Figure 2:
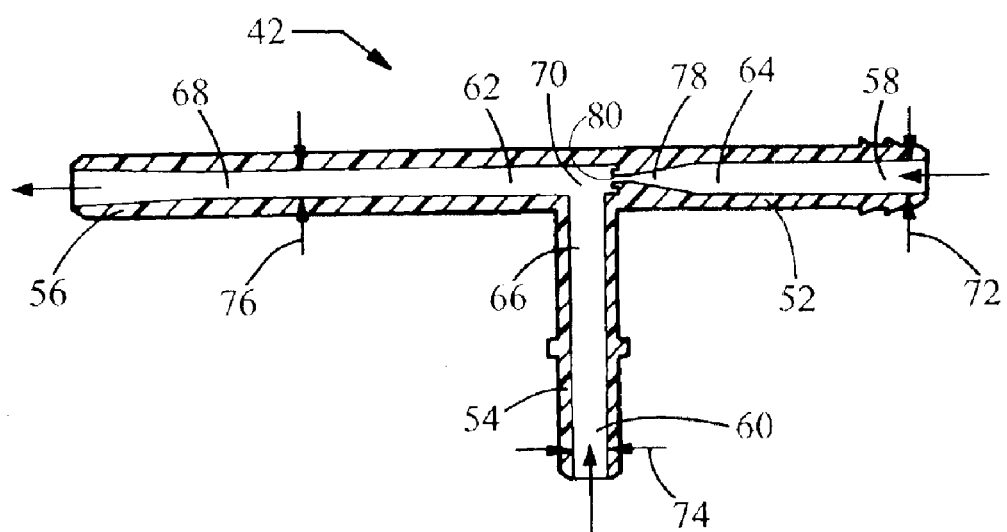
FIG. 2 is a cross-sectional view of a first embodiment of a jet pump utilized with the present invention.

As illustrated in FIG. 2, the pump 42 has a first inlet 52, a second inlet 54 and an outlet 56. The first inlet 52 is in fluid communication with the second diverter outlet 50 via a conduit 53 and, therefore, receives the fuel 26 exiting from the second diverter outlet 50. The second inlet 54 of the jet pump 42 is in fluid communication with the passive side of the tank 32 via the crossover tube 44. The jet pump outlet 56 directs fuel 26 from the jet pump 42 into the active side 30 of the tank 24. The fuel 26 exiting from the jet pump 42 includes fuel 26 that was received from the fuel pump 36 and from the passive side 32 via the crossover tube 44.

As illustrated in FIG. 2, the jet pump 42 is preferably T-shaped with all its internal passages in a single plane. The jet pump first inlet 52 and outlet 56 are coaxial and the second inlet 54 is angled with respect thereto. Described another way, the first inlet 52, the second inlet 54 and the outlet 56 each has an upstream portion 58, 60, 62 respectively and a downstream portion 64, 66, 68 respectively. The downstream portion 64 of the jet pump 42 first inlet 52, the downstream portion 66 of the jet pump 42 second inlet 54 and the upstream portion 62 of the jet pump 42 outlet 56 meet at the intersection 70 of the T.

The inner diameter 72 of the jet pump 42 first inlet 52 is preferably between 3–5 millimeters. The inner diameter 74 of the jet pump 42 second inlet 52 is preferably between 4–7 mm. The inner diameter 76 of the jet pump 42 outlet 56 is preferably between 5–8 mm.

Further, the downstream portion 64 of the jet pump 42 first inlet 52 is tapered to create a nozzle 78. The inner diameter 72 of the nozzle inlet is preferably between 3–5 mm and the inner diameter 80 of the nozzle 78 outlet is preferably between 0.3–1.0 mm.

As the fuel 26 exits from the nozzle 78, a vacuum is created around the fuel traveling through the intersection 70 of the T. The vacuum draws the fuel 26 into the second inlet 54 through the single crossover tube 44 from the passive side 32 of the tank 24.

Referring to FIG. 1, the single cross-over tube 44 communicates with the active saddle side 30 and the passive saddle side 32 via an inlet 82 and an outlet 84. Preferably, the inner diameter 86 of the crossover tube 44 is between 10–15 mm. Positioned in the passive side 32 of the tank 24 is the inlet 82 of the cross-over tube 44 and positioned in the active side 30 of the tank 24 is the outlet 84 of the cross-over tube 44. Preferably the inlet 82 is located in a lower most portion of the passive side 32. The outlet 84 is in fluid communication with the jet pump second inlet 54. Therefore, the fuel 26 from the passive side 32 of the tank 24 enters the cross-over tube 44 inlet 82 and travels through the tube 44, exiting from the cross-over tube outlet 84 into the jet pump 42 second inlet 54.

Several different embodiments of the fuel delivery system, and more specifically, of the diverter 40 are presented herein. In a first embodiment, shown in FIG. 1, the diverter 40 is a T-valve. In a second embodiment, shown in FIGS. 3 and 4, the diverter 240 is replaced with a parallel pressure relief valve ("PPRV"). In a third embodiment, shown in FIGS. 5 and 6, the diverter and the jet pump are an integrated component 340.

Figure 4:
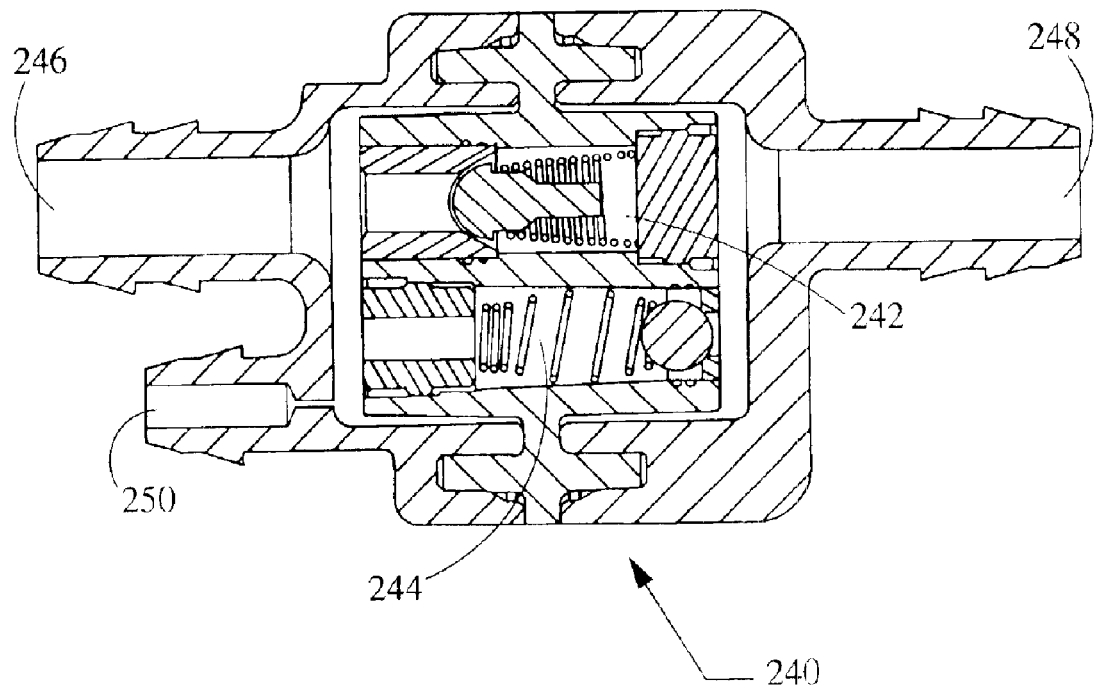
FIG. 4 is a cross-sectional view of a parallel pressure relief valve as used in the second embodiment.
Figure 3:
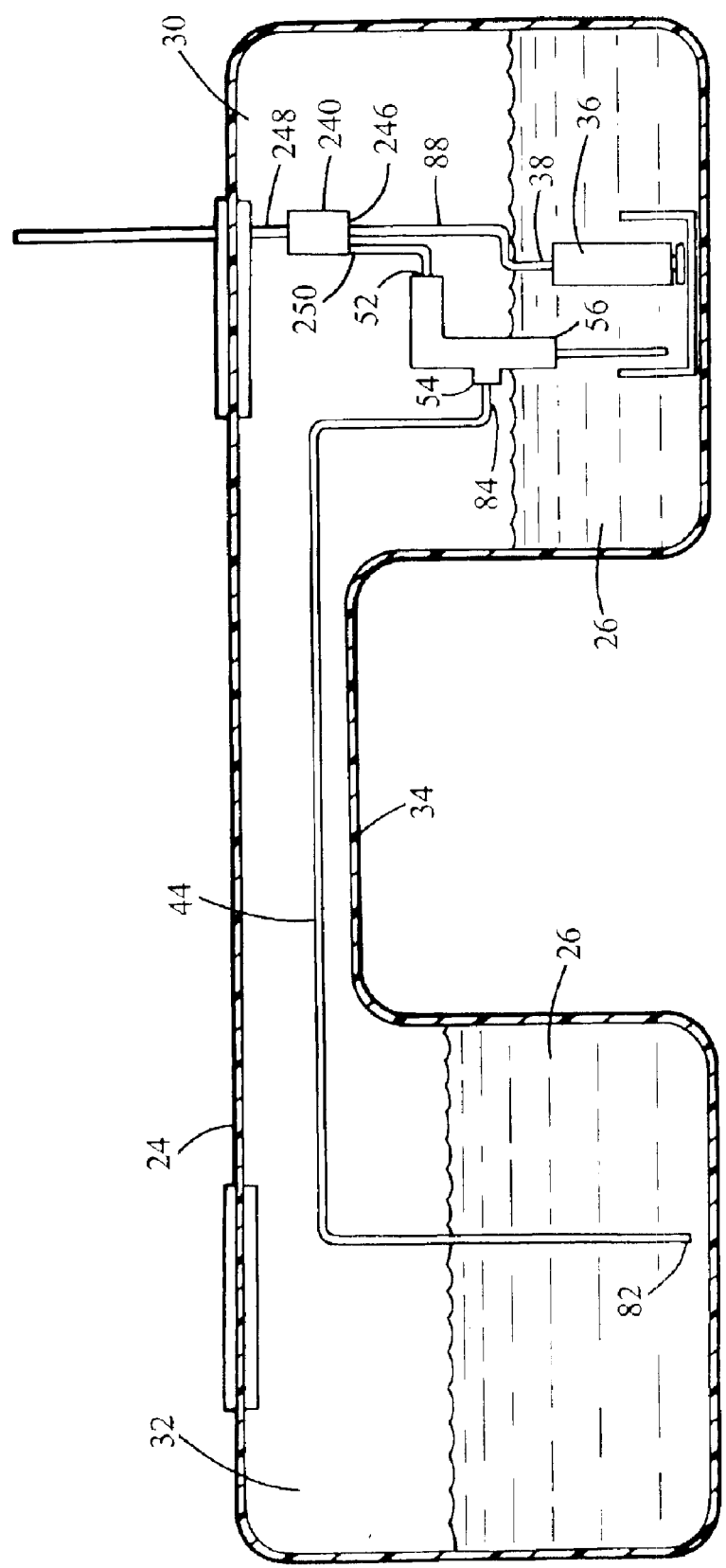
FIG. 3 is a schematic view of a second embodiment of the fuel delivery system of the present invention.

In the second embodiment, illustrated in FIGS. 3 and 4, hosing 88 connects the fuel pump 36 to a PPRV 240, which acts as the diverter. The PPRV 240 acts as both a check valve 242 and a pressure relief valve 244. One section of the PPRV 240 contains the check valve 242 and arranged in a parallel section is the pressure relief valve 244.

As more readily seen in FIG. 4, the PPRV 240 includes an inlet 246, a first outlet 248 and a second outlet 250. The inlet 246 is in fluid communication with the fuel pump 36. The first outlet 248 is positioned downstream from the check valve 242 generally in line with the first outlet 248. Also positioned downstream from the check valve 242 is the second outlet 250. The second outlet 250 is also referred to as a bleed port.

Fuel 26 that has been supplied to the PPRV 240 from the fuel pump 36, but which is not needed by the engine, bleeds through the bleed port 250 and is directed to the jet pump first inlet 52. The jet pump 42 in this embodiment is of the same construction as the jet pump described above and illustrated in FIG. 2. Therefore, the fuel 26 that flows through the bleed port 250 and into the first inlet 52 of the jet pump 42 creates a vacuum as it flows through the jet pump 52 the first inlet 52 nozzle 78. This vacuum draws fuel 26 from the passive side 32 of the tank to the active side 30 of the tank.

Figure 5:
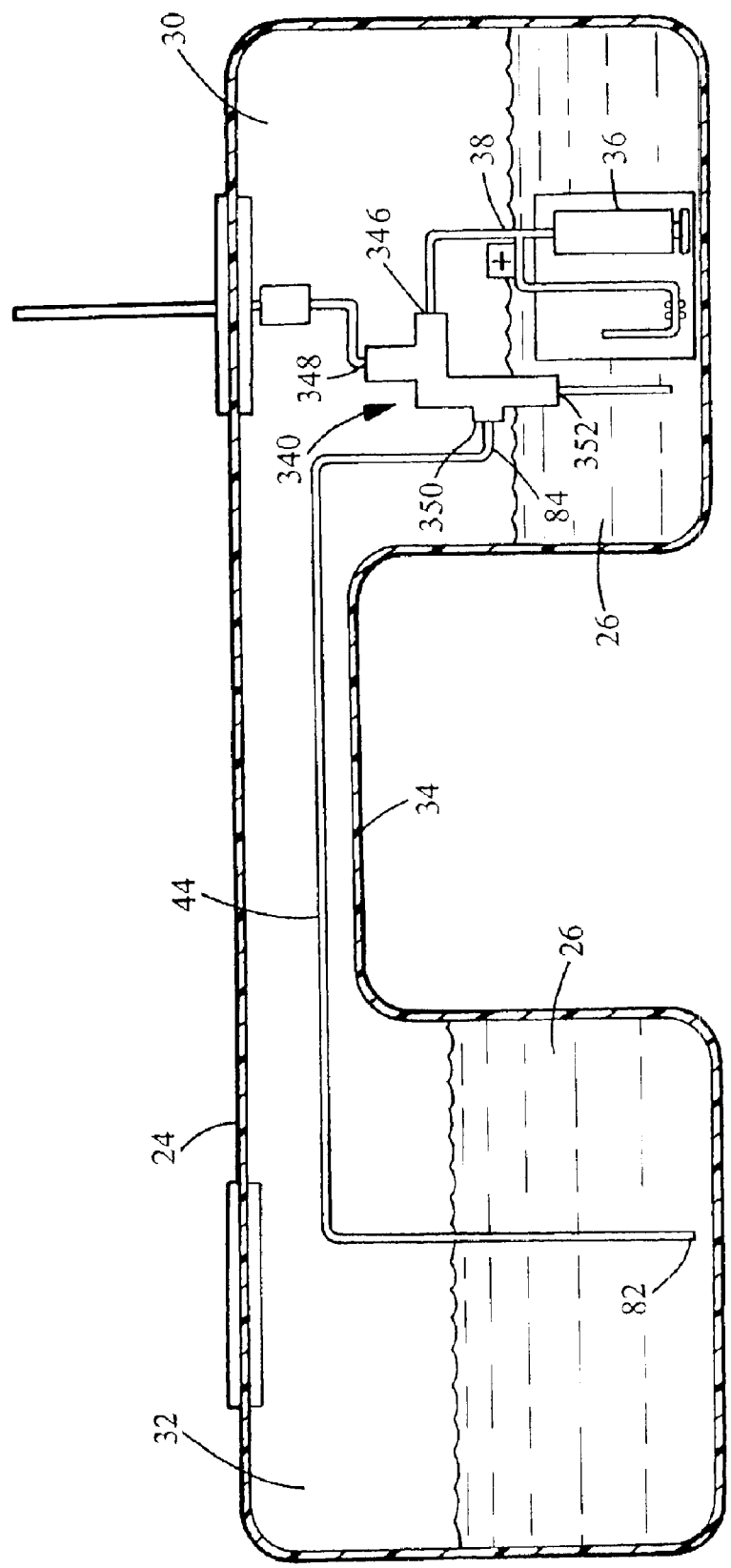
FIG. 5 is a schematic view of a third embodiment of the fuel delivery system of the present invention.
Figure 6A:
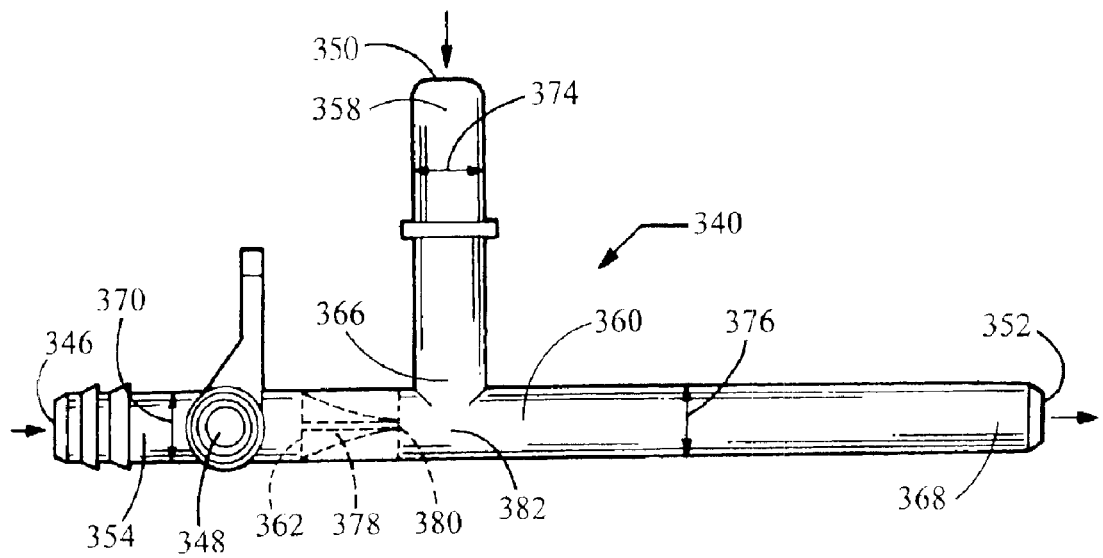
FIG. 6A is a top view of a second embodiment of the jet pump of the present invention.
Figure 6B:
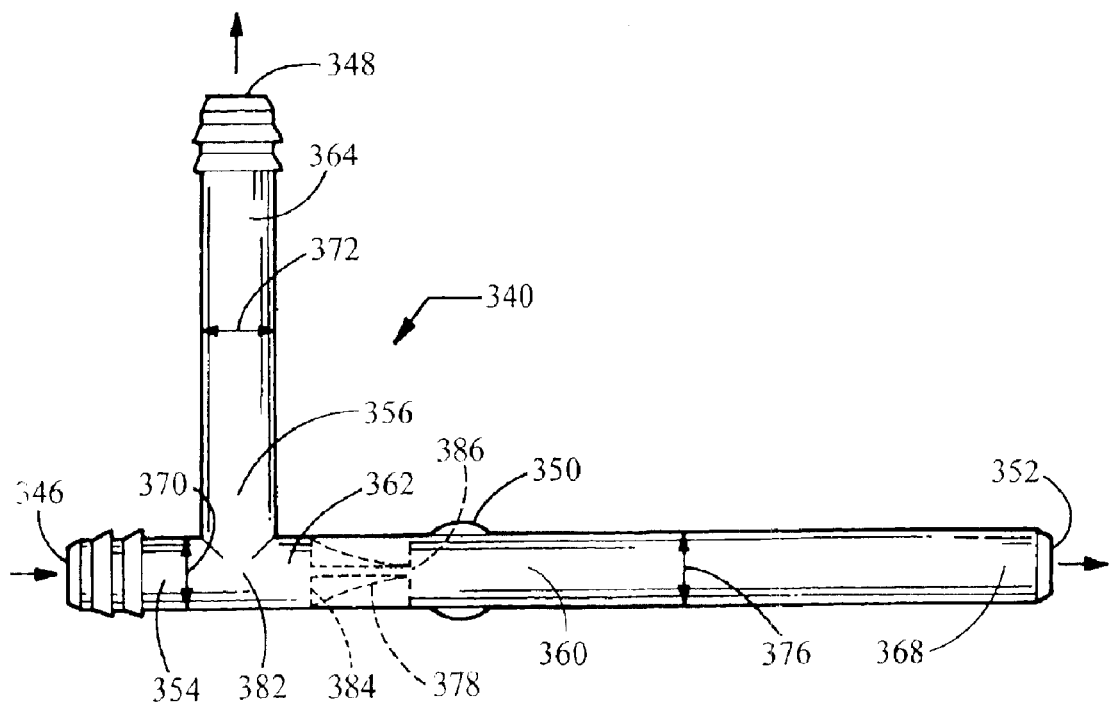
FIG. 6B is a side view of the second embodiment of the jet pump of the present invention.

In the third embodiment, illustrated in FIGS. 5, 6A and 6B, the diverter 40 and jet pump 42 of the first embodiment are replaced with an integrated diverter and jet pump 340. The integrated diverter and jet pump 340 has four arms defining two inlets 346, 350 and two outlets 348, 352. Each inlet and each outlet includes an upstream portion 354, 358, 356, 360 and a downstream portion 362, 366, 364, 368. The first inlet 346 is in fluid communication with the fuel pump outlet 38 and therefore receives fuel 26 pumped from the fuel pump 36. The second inlet 350 is in fluid communication with the passive side 32 of the saddle tank and therefore receives fuel 26 from the outlet 84 of the crossover tube 44. The first outlet 348 is in fluid communication with the vehicle's engine. The second outlet 352 empties into the active side 30 of the saddle tank.

Preferably, the inner diameter 370 of the first inlet 346 upstream portion 354 is between 5–10 mm. The inner diameter 374 of the second inlet 350 is between 4–7 mm. The inner diameter 372 of the first outlet 348 is between 5–10 mm. The inner diameter 376 of the second outlet 352 is between 5–8 mm.

In use, fuel enters into the upstream portion 354 of the first inlet 346. As the fuel 26 moves downstream, some of it is diverted into the upstream portion 356 of the first outlet 348 and ultimately is delivered to the vehicle's fuel rail which delivers the fuel 26 to the engine. The remainder of the fuel 26 traveling through the first inlet 346, which was not diverted into the first outlet 348, enters into the downstream portion 362 of the first inlet 346. The downstream portion 362 of the first inlet 346 includes an internal nozzle 378. In one preferred embodiment, the inner diameter 370 of a nozzle inlet 384 is between 4–7 mm and the inner diameter 380 of a nozzle outlet 386 is between 5–8 mm. Obviously, the specific dimensions will be dictated by the specifics of the fuel system into which it is incorporated. As the fuel 26 exits from the nozzle 378 a vacuum is created around the fuel.

The first inlet 346 and the nozzle 378 are located so as to be co-axial with the second outlet 352. The second inlet 350 joins at an angle with respect to these portions and immediately downstream of the nozzle 378 at what is designated as intersection 382. The vacuum created in the intersection 382 draws the fuel through second inlet 350 through the crossover tube 44 from the passive side 32 of the tank. The mixture of fuel from the active and passive sides 30, 32, and accordingly the two jet pump inlets 346, 350, is then expelled through the second jet pump outlet 368 and into the active side 30 of the saddle tank.

As a person skilled in the art of fuel delivery systems will recognize from the previous detailed description and from the figures and claims, modifications and changes can be made to the preferred embodiments of the invention without departing from the scope of this invention defined in the following claims.

What is claimed is:

1. A fuel delivery assembly for use in a saddle fuel tank that stores fuel for a vehicle having an engine, the saddle fuel tank having a first side and a second side, said fuel delivery assembly comprising:
   a fuel pump adapted to be positioned in the first side of said saddle fuel tank, said fuel pump having an Inlet and an outlet;
   a diverter having an inlet in fluid communication with said fuel pump outlet, a first outlet being in fluid communication with the engine, and a second outlet;
   a jet pump adapted to be positioned in the first side of said saddle a tank, said jet pump having a first inlet adapted to be in fluid communication with said diverter second outlet, said jet pump also having a second inlet adapted to be in fluid communication with the second side of the saddle fuel tank, and said diverter having an outlet adapted to be in fluid communication with the first side of the saddle fuel tank; and
   a single crossover tube adapted to communicate between the first side and the second side, wherein the crossover tube has an inlet in the second side of the saddle fuel tank and an outlet in fluid communication with said second inlet of said jet pump;
   wherein said diverter is a T-shaped valve; and
   wherein said jet pump is T-shaped and includes an internally positioned nozzle.

2. A fuel delivery assembly for use in a saddle fuel tank that stores fuel for a vehicle having an engine, the saddle fuel tank having a first side and a second side, said fuel delivery assembly comprising:
   a fuel pump adapted to be positioned in the first side of said saddle fuel tank, said fuel pump having an inlet and an outlet;
   a diverter having an inlet in fluid communication with said fuel pump outlet, a first outlet being in fluid communication with the engine, and a second outlet;
   a jet pump adapted to be positioned in the first side of said saddle tank, said jet pump having a first inlet adapted to be in fluid communication with said diverter second outlet, said jet pump also having a second inlet adapted to be in fluid communication with the second side of the saddle fuel tank, and said diverter having an outlet adapted to be in fluid communication with the first side of the saddle fuel tank; and
   a single crossover tube adapted to communicate between the first side and the second side, wherein the crossover tube has an inlet in the second side of the saddle fuel tank and an outlet in fluid communication with said second inlet of said jet pump;
   wherein said diverter is a parallel pressure relief valve.

3. The fuel delivery assembly of claim 2 wherein said parallel pressure relief valve includes a check valve, a pressure relief valve arranged parallel to the check valve, an inlet in fluid communication with said fuel pump, a first outlet positioned downstream from said check valve and in fluid communication with the engine, and a second outlet exiting into the first side of the saddle fuel tank.

4. The fuel delivery assembly of claim 2 wherein said jet pump is T-shaped.

5. The fuel delivery assembly of claim 2 wherein said jet pump includes an internally positioned nozzle.

6. The fuel delivery assembly of claim 5 wherein said first inlet of said jet pump has an upstream portion and a downstream portion and said downstream portion includes said nozzle.

7. The fuel delivery assembly of claim 2 wherein said single crossover tube is within the saddle tank.

8. A fuel delivery assembly for use in a saddle fuel tank that stores fuel for a vehicle having an engine, the saddle fuel tank having a first side and a second side, said fuel delivery assembly comprising:
   a fuel pump adapted to be positioned in the first side of said saddle fuel tank, said fuel pump having an inlet and an outlet;
   a diverter having an inlet in fluid communication with said fuel pump outlet, a first outlet being in fluid communication with the engine, and a second outlet;
   a jet pump adapted to be positioned in the first side of said saddle tank, said jet pump having a first inlet adapted to be in fluid communication with said diverter second outlet, said jet pump also having a second inlet adapted to be in fluid communication with the second side of the saddle fuel tank, and said diverter having an outlet adapted to be in fluid communication with the first side of the saddle fuel tank; and
   a single crossover tube adapted to communicate between the first side and the second side, wherein the crossover tube has an inlet in the second side of the saddle fuel tank and an outlet in fluid communication with said second inlet of said jet pump;
   wherein said diverter and said jet pump are an integrated component.

9. The fuel delivery assembly of claim 8 wherein said integrated component has a first inlet in fluid communication with said fuel pump outlet, a second inlet in fluid communication with said cross-over tube, a first outlet in fluid communication with the engine and a second outlet exiting into the first side of the tank.

10. The fuel delivery assembly of claim 9 wherein said integrated component defines an internal nozzle.

11. The fuel delivery assembly of claim 10 wherein said nozzle is located upstream of said second inlet of said integrated component.

12. The fuel delivery assembly of claim 10 wherein said nozzle is located downstream of said first outlet.

* * * * *